United States Patent [19]

Jones, III

[11] 4,051,631

[45] Oct. 4, 1977

[54] PLANTERS HAVING LIGHT-TRANSMITTING ENCLOSURES

[76] Inventor: John B. Jones, III, The Willows, Hardscable Road, North Salem, N.Y. 10560

[21] Appl. No.: 723,585

[22] Filed: Sept. 15, 1976

[51] Int. Cl.² ............................................. A01G 9/02
[52] U.S. Cl. ............................................. 47/69; 47/67; 47/83
[58] Field of Search .......................... 47/66, 67, 69, 1; 119/15

[56] References Cited

U.S. PATENT DOCUMENTS

| 3,269,578 | 8/1966 | Lewis | 47/1 X |
| 3,626,902 | 12/1971 | Orfei | 119/15 |
| 3,939,607 | 2/1976 | Spector | 47/69 |
| 3,995,396 | 12/1976 | Spector | 47/69 |

Primary Examiner—Robert E. Bagwill
Attorney, Agent, or Firm—Robert T. Tobin

[57] ABSTRACT

Vertically and horizontally disposed planters including light-transmitting, convex, upwardly or outwardly extending enclosures are disclosed. The planter enclosures extend in a convex manner to enclose with a light transmitting section the earthen matter from which the plants grow as well as enclosing at least in part a growing plant itself. The vertically disposed planters comprise outwardly extending enclosures which are supported in vertical, preferably planar members such as doors and panels. The horizontally disposed planters comprise enclosures which comprise a downwardly extending lower convex portion enclosing the earthen matter and an upwardly extending light-transmitting portion enclosing, at least in part, a growing plant. The horizontally disposed planters are supported in horizontal preferably planar members such as skylights and roofs. For essentially completely enclosed planters, fixed and closable openings are also disclosed. These permit the passage of air, moisture, nourishment, etc. to the plants as well as permitting easy access for the cultivation of the plants.

15 Claims, 7 Drawing Figures

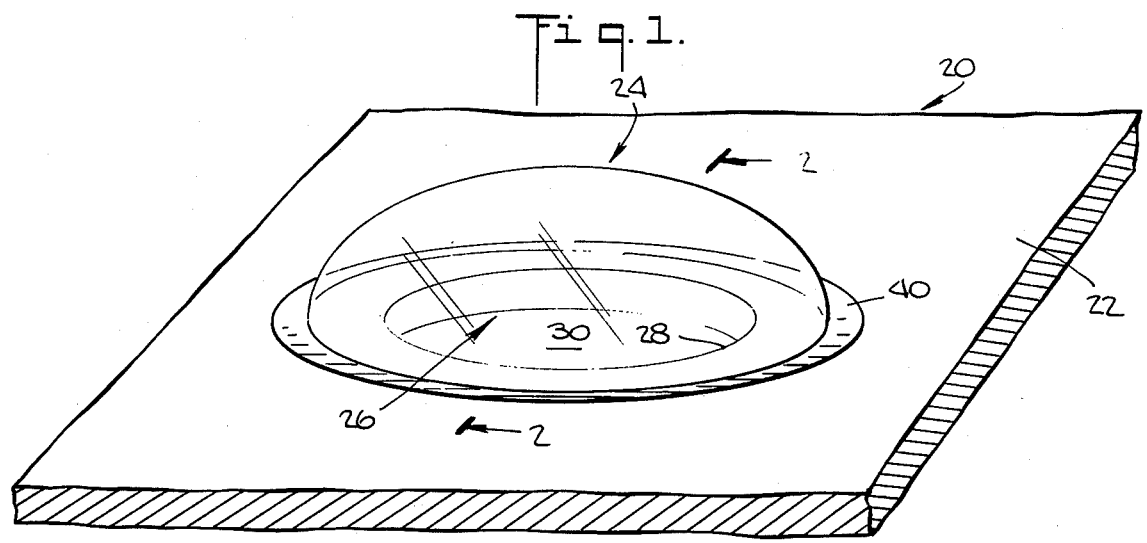
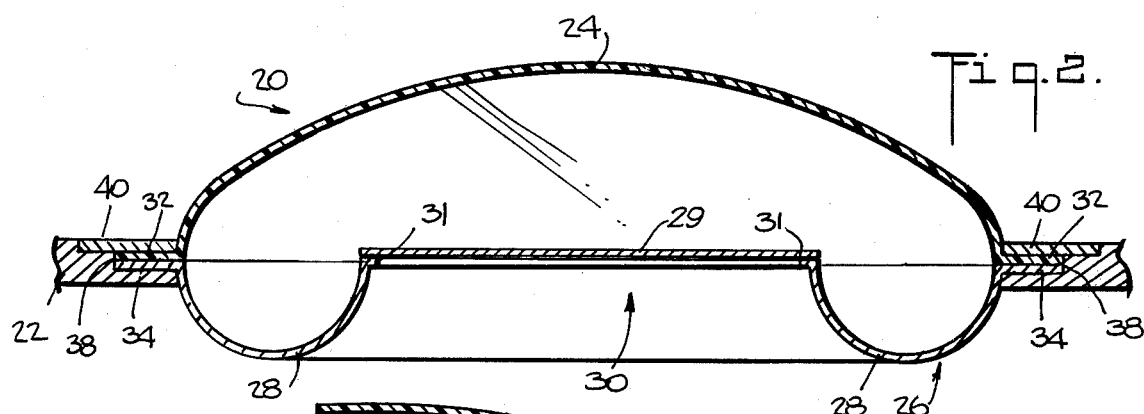
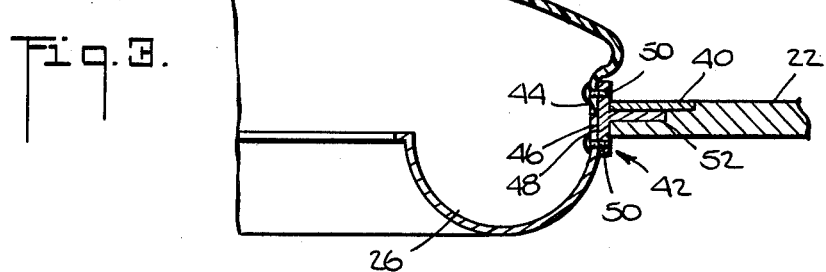
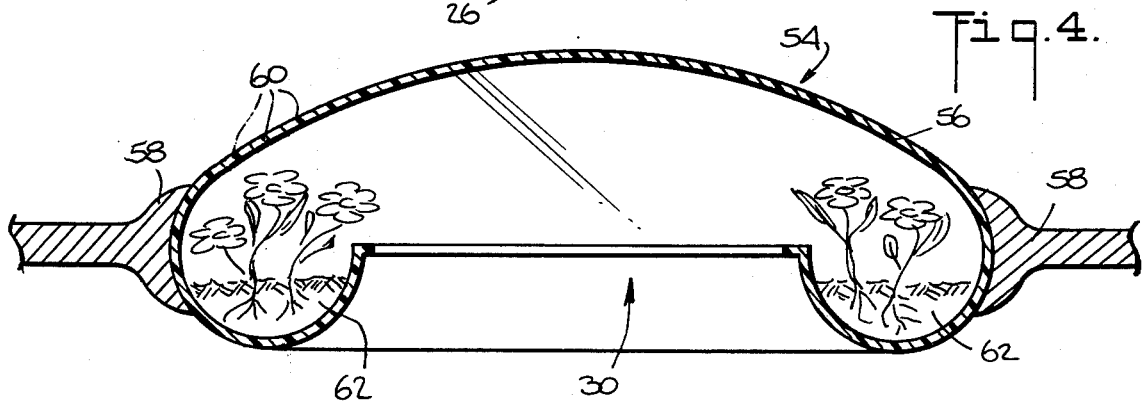

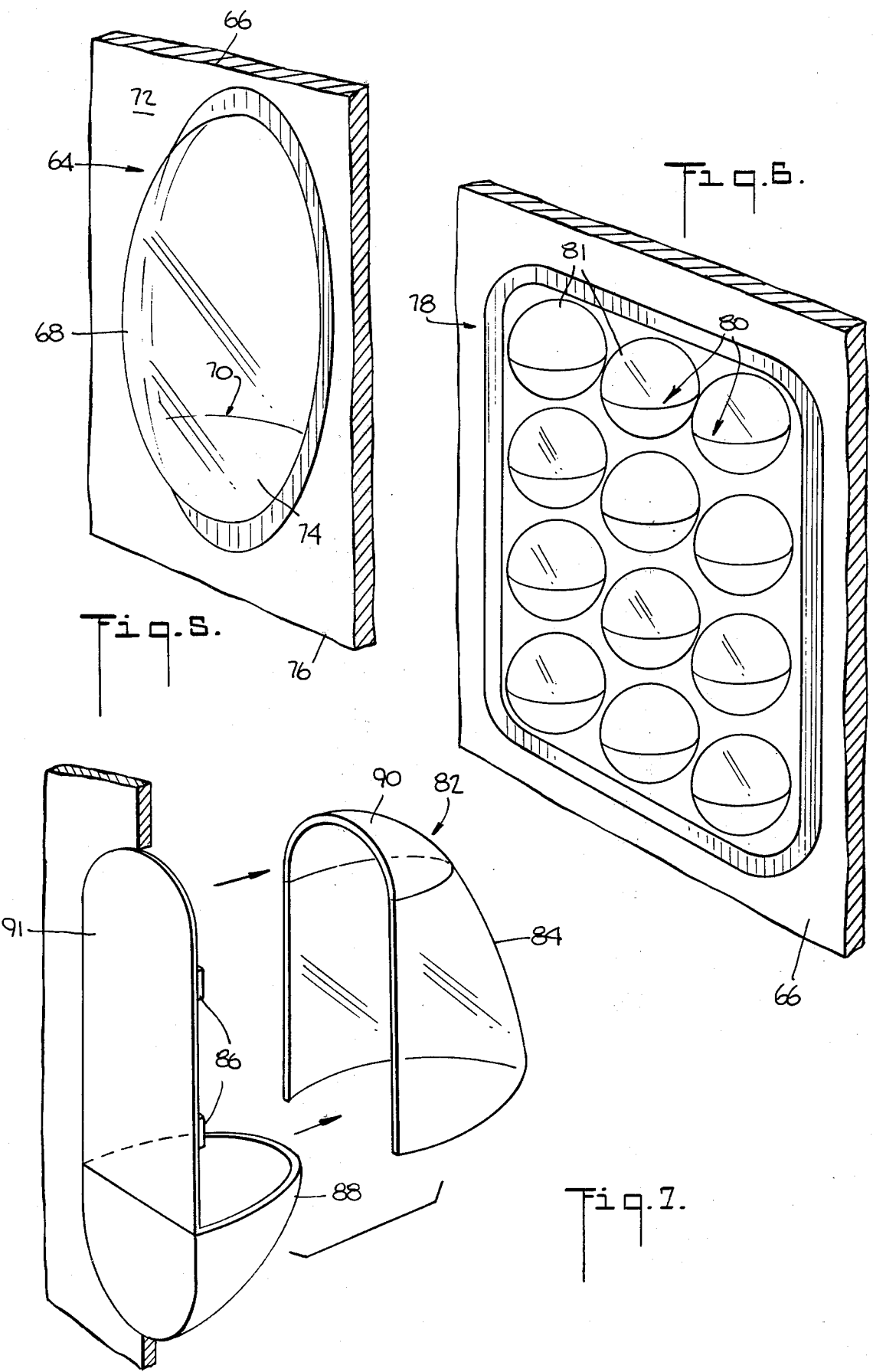

PLANTERS HAVING LIGHT-TRANSMITTING ENCLOSURES

BACKGROUND OF THE INVENTION

The present invention relates to planters, and more particularly, to planters having a light-transmitting enclosure section.

Planters for growing plants in the interior of structures are usually placed near windows and doors, which transmit the necessary sunlight while protecting the plants from the exterior environment. Whether or not the plants are interiorly or exteriorly placed, they usually require separate supports, such as window sills or boxes, tables, stands and the like. When the planters are placed in the interior of a structure, unless there are suitable window sills present, the planters will usually require separate supports which take up valuable interior floor space. There are, therefore, several important factors to be considered in the construction and placement of planters, such as accessibility to sunlight, protection from the exterior environment where necessary, space requirements, and accessibility to the planter itself as well as to the interior of the planter for providing moisture, nourishment and cultivation of the plants. My U.S. Pat. No. 3,879,891 issued on Apr. 29, 1975 discloses planters which are supported in vertical windows, each planter comprising an outwardly bulging, light-transmitting central portion which is surrounded by a flange adapted to be vertically supported in a window frame.

SUMMARY OF THE INVENTION

Planters according to the present invention require no separate supports and are preferably mounted in an existing structure thereby not utilizing any floor space. Additionally, according to the present invention, planters are protected from the exterior environment by a light-transmitting enclosure and, where the enclosure substantially encloses the entire planter, the planters are provided with fixed and closable openings to permit passage of air, moisture, nourishment, etc., and to permit ready access to the interior of the planters for cultivating of the plants. The present invention is embodied in and carried out by vertically and horizontally disposed planters including light-transmitting, convex, upwardly or outwardly extending enclosures. The planter enclosures extend in a convex manner to enclose the plant in at least a partial light-transmitting section. When a plant is grown in the interior of a planter constructed according to this invention, the planter preferably separates the plant from the exterior environment. In order to accomplish this the planter include an enclosure for earthen or plant growing material over which the light-transmitting section preferably extends in a unitary structure. The vertically disposed planters, constructed according to this invention, comprise a convex light-transmitting section which extends vertically from the earthen matter enclosure. The vertically disposed planters are preferably supported by a vertical planar member such as a door or panel. The horizontally disposed planters according to the invention comprise a convex horizontally disposed light-transmitting section which extends upwardly from the earthen matter enclosure. The horizontally disposed planters are preferably supported by a horizontal planar member such as a skylight or roof. Further in accordance with the invention, fixed and closable openings are provided for planters which are substantially enclosed.

These and other aspects of the invention will be more apparent when considered with the following detailed description and accompanying drawing.

BRIEF DESCRIPTION OF THE DRAWING

The invention is illustrated by way of example and not limitation in the following figures of the accompanying drawing in which like numerals refer to like parts and in which:

FIG. 1 is a perspective view of a horizontally disposed planter according to the invention FIG. 2 is a sectional view of the planter of FIG. 1 taken along line 2—2 of FIG. 1;

FIG. 3 is a side partially broken away, section view of another horizontally disposed planter according to the invention;

FIG. 4 is a side sectional view of a one-piece horizontally disposed planter according to the invention;

FIG. 5 is a perspective view of a vertically disposed planter according to the invention;

FIG. 6 is a perspective view of a vertically disposed composite planter made up of a plurality of individual planters according to the invention; and FIG. 7 is a perspective view of a planter having a movable enclosure according to the invention.

DETAILED DESCRIPTION OF THE PREFERRED EMBODIMENT

Referring to FIGS. 1 and 2, a preferred embodiment of a horizontally disposed planter 20 is shown. Planter 20 is secured in a horizontally planar member 22 only part of which is shown in FIG. 1 The planter 20 comprises light-transmitting section 24 and earthen matter enclosure 26. Light-transmitting section 24 is generally horizontally disposed with respect to planar member 22, extending upward from member 22 in a convex somewhat semi-ellipsoidal shape. Joined to the light-transmitting section 24 is the earthen matter enclosure 26 which comprises a trough-shaped receptacle or track 28 running around the periphery of the planter. Access to the interior of planter 20 is provided through opening 30 adjacent to, and surrounded by, the peripheral receptacle 28. Space 30 may be closed by a light-transmitting closure member 29 hinged to the receptacle or snapped into engagement with the receptacle or rested on receptacle end 31. In such a case, the planter may be exposed to the exterior on all sides and may function as a miniature greenhouse or as a terrarium.

As shown in FIGS. 1 and 2, planter 20 comprises two pieces, light-transmitting section 24 and earthen enclosure 26. In order to secure the two pieces, each is provided with opposed flanges 32, 34 extending horizontally at the extremity of the respective piece. The pieces are joined at the flanges by, for example, adhesives or fasteners (not shown). Weather sealing may be provided between, or proximate to the flanges to make the planter weather-tight to the exterior environment. Flanges 32, 34 are also used to support the planter in planar member 22. An opening, sized to accept the planter, is provided in member 22. A shoulder 38 adjacent to and surrounding the opening, is sized to receive and support flanges 32, 34 thereon. A rim molding 40 is placed over flanges 32, 34 on shoulder 38 to secure the planter thereon. Molding 40 may be secured to planar member 22 by, for example, adhesives or fasteners (not shown), and flanges 32, 34 may additionally be secured to the shoulder by adhesives or fasteners. Weather sealing may be provided at the shoulder to make the planter-planar member joint weather-tight. Alternatively, as shown in FIG. 3, the light-transmitting section 24 may be joined to the earthen enclosure 26 by belt 42. The light-transmitting section and earthen enclosure are provided with opposed ends 44, 46 and the inside 48 of the belt is shaped to conform to the exterior shape of the opposed ends. Advantageously, the exterior of the opposed ends and the belt interior are planar. Preferably, fasteners such as screws 50 secure the individual pieces to the belt. The belt secures the light-transmitting section to the earthen enclosure as well as securing these pieces to the belt. Belt 42 is provided with flange 52 which is secured in planar member 22 as described hereinabove. Opposed ends 44, 46 of the planter may be provided with means, such as a tongue and groove joint (not shown), for mating the light-transmitting section to the earthen enclosure.

Referring now to FIG. 4, planter 54 is shown comprising a one-piece light-transmitting and earthen enclosure 56. Advantageously, the single piece 56 is molded of a transparent plastic material. Planter 54 is secured to support bracket 58 by, for example, adhesives or fasteners, and the bracket is secured in planar member 22 as described hereinbefore. Holes 60 may be provided in the light-transmitting section to permit the passage of air therethrough. Earthen matter 62 from which plants grow is in track 28. Access to the plants and earthen matter is provided through aperture 30.

The horizontally disposed planters are secured in members 22 which may include, for example, skylights, roofs, etc. of fixed structures or vehicles.

Referring to FIGS. 5 and 6, vertically disposed planters are shown constructed according to the invention. Planter 64 is mounted vertically in and with respect to member 66, only part of which is shown and which is shown to be planar. Planter 64 comprises light-transmitting section 68 and earthen matter enclosure 70. Light-transmitting section 68 is vertically disposed with respect to planar member 66, extending outwards from one side 72 of member 66 in a convex manner, shown to be somewhat semi-ellipsoidal in general shape. However, other shapes are also suitable. Earthen matter enclosure 70 comprises a bowl-like receptacle 74 extending outwards from the other side 76 of the planar member. The exterior will, of course, face side 72 of member 66. The earthen matter enclosure and the light-transmitting section are joined, for example, by flanges or a belt as described hereinbefore with respect to FIGS. 1-3, or may be of unitary structure as described hereinbefore with respect to FIG. 4. Planter 64 is secured in planar member 66, for example, by a shoulder on the planar member and a rim molding as described hereinbefore for FIGS. 1-4. Planter 64 may be enclosed on both sides, not shown, by extending the earthen matter enclosure upwards. In such a case the upper portion of the earthen matter enclosure, or the light-transmitting section is movable and, for example, is hinged on or snapped into engagement with the planter. When planter 64 is essentially completely enclosed, it may also function as an exterior miniature greenhouse or as a terrarium.

In FIG. 6 is shown a vertically disposed planter 78 having a plurality of miniature earthen enclosures 80 and corresponding light-transmitting section 81. Planter 78 may be a unitary structure or may comprise individual planters joined together, for example, as set forth in my aforementioned patent. In either case, planter 78 is secured to member 66 as described hereinbefore for planter 64.

The vertically disposed planters are secured in members 66 which may include doors, panels, walls, etc., of fixed structures as well as in vehicles.

As mentioned hereinbefore, the horizontally disposed and vertically disposed planters may be essentially entirely enclosed; or they may be substantially enclosed. Referring to FIG. 7, a planter 82 is shown with removable portion 84. As shown, portion 84 comprises the light-transmitting section of a vertically disposed planter. However, other parts of the planter and of horizontally disposed planters may be made movable. The removable portion 84 is secured by, for example, frictional engagement with snaps 86 positioned on member 66. Portion 84 may also be hinged in known manner to member 66 or to enclosure 88 to swing horizontally or vertically therefrom. Portion 84 may vary in size and may only comprise a small portion 90. Other parts of the planters, such as section 91, may also be made movable. Where essentially or substantially all of a vertically or horizontally disposed planter is enclosed, interior or exterior portions, or both may be made removable in accordance with the foregoing.

The planters according to the invention may be made partially or entirely of glass, light-transmitting plastic, transparent plastic and the like, and may be made in known manner as unitary structures or in parts and joined in known manner or as illustrated hereinbefore. The sizes and shapes set forth are by way of illustration and other sizes and shapes are also suitable to practice the invention. Additionally, fixed openings and movable openings may be provided in many different parts of the planters without departing from the spirit and scope of the invention. The planters according to the present invention may be completely, substantially or partially enclosed, and when completely enclosed, they may function as exterior miniature greenhouses or as terrariums.

The advantages of the present invention, as well as certain changes and modifications of the disclosed embodiments thereof, will be readily apparent to those skilled in the art. It is the applicant's intention to cover by his claims all those changes and modifications which could be made to the embodiments of the invention herein chosen for the purposes of the disclosure without departing from the spirit and scope of the invention.

What is claimed is:

1. A planter comprising a dome-shaped portion which is at least in part light-transmitting a generally trough-shaped planting portion adapted to retain a planting medium therein below said dome-shaped portion, said planting portion having an inner and outer wall, said outer wall joined to said dome-shaped portion and at least a portion of which is substantially coextensive with the perimeter of said dome-shaped portion, there being an access opening defined by said inner wall of said planting portion, permitting access to both said dome-shaped and planting portions, and means for mounting said planter in a substantially horizontal position.

2. The planter of claim 1, wherein said upper dome-shaped and plant retaining portions are separate pieces.

3. The planter of claim 2, wherein said means for mounting said planter comprise a first flange extending from the perimeter of said dome-shaped portion and a second flange extending from said outer wall of said planting portion superimposed on said first flange.

4. The planter of claim 3, wherein said means for mounting said planter further comprises means for securing said flanges in a superimposed position.

5. The planter of claim 2, wherein said means for mounting said planter comprises opposed planar portions in cross-section located in said dome-shaped portion along the perimeter thereof and in said outer wall of said planting portion, first means extending about the perimeter of said dome-shaped portion and about said outer wall overlapping said opposed planar portions with a surface substantially coextensive with surfaces of said opposed planar portions which it overlaps, and second means for securing said first means to said dome-shaped portion and to said planting portion, said first means further comprising a radial flange extending outwardly with respect to said opposed planar portions.

6. The planter of claim 1, wherein the planting portion is semi-tubular in shape.

7. The planter of claim 1, wherein said dome-shaped portion is semi-ellipsoidal in shape.

8. The planter of claim 1, and further comprising a light-transmitting closure member to close said opening.

9. The planter of claim 1, and further comprising means for opening at least a part of said dome-shaped portion.

10. The planter of claim 1, wherein the planter is secured in a substantially horizontally disposed member.

11. The planter of claim 10, wherein the planter is secured in a skylight.

12. The planter of claim 10, wherein the planter is secured in a roof structure.

13. The planter of claim 10, wherein the planter is secured in a movable structure.

14. The planter of claim 1, wherein said planting portion extends along substantially the entire perimeter of said dome-shaped portion with said opening located in the center of both the dome-shaped and trough-shaped portions.

15. The planter of claim 1, wherein said upper dome-shaped and plant retaining portions are of one piece construction.

* * * * *

UNITED STATES PATENT AND TRADEMARK OFFICE
CERTIFICATE OF CORRECTION

PATENT NO. : 4,051,631
DATED : October 4, 1977
INVENTOR(S) : John B. Jones, III

It is certified that error appears in the above-identified patent and that said Letters Patent are hereby corrected as shown below:

Column 3, line 27, after "is" insert -- placed --.

Signed and Sealed this

Seventh Day of February 1978

[SEAL]

Attest:

RUTH C. MASON
*Attesting Officer*

LUTRELLE F. PARKER
*Acting Commissioner of Patents and Trademarks*